US009554389B2

(12) United States Patent
Anchan et al.

(10) Patent No.: US 9,554,389 B2
(45) Date of Patent: Jan. 24, 2017

(54) SELECTIVELY ALLOCATING QUALITY OF SERVICE TO SUPPORT MULTIPLE CONCURRENT SESSIONS FOR A CLIENT DEVICE

(71) Applicant: QUALCOMM Incorporated, San Diego, CA (US)

(72) Inventors: Kirankumar Anchan, San Diego, CA (US); Arvind V. Santhanam, San Diego, CA (US); Karthika Paladugu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 14/012,956

(22) Filed: Aug. 28, 2013

(65) Prior Publication Data
US 2014/0064210 A1    Mar. 6, 2014

Related U.S. Application Data

(60) Provisional application No. 61/695,740, filed on Aug. 31, 2012.

(51) Int. Cl.
*H04W 72/08*    (2009.01)
*H04W 76/00*    (2009.01)
(Continued)

(52) U.S. Cl.
CPC ........... *H04W 72/08* (2013.01); *H04W 76/002* (2013.01); *H04W 4/06* (2013.01); *H04W 8/186* (2013.01)

(58) Field of Classification Search
None
See application file for complete search history.

(56) References Cited

U.S. PATENT DOCUMENTS 8,289,870 B2    10/2012  Michaelis et al.
8,422,448 B2    4/2013   Chu et al.
(Continued)

FOREIGN PATENT DOCUMENTS

EP    2408152 A1    1/2012

OTHER PUBLICATIONS

Alcatel Lucent, "The LTE Network Architecture, A comprehensive tutorial." Dec. 2, 2009.*
(Continued)

*Primary Examiner* — Robert M Morlan
(74) *Attorney, Agent, or Firm* — Muncy, Geissler, Olds & Lowe, P.C.

(57) ABSTRACT

In an embodiment, a server mediates a first group communication session with the user equipment (UE) by exchanging media for the first group communication session with the UE over a first link with a first level of Quality of Service (QoS) resources (e.g., either without a guaranteed bit rate (GBR) or a threshold amount of GBR) and exchanging non-media signaling data for the first group communication session with the UE over a signaling link that is either the same or separate from the first link. The server detects, while the UE continues participation in the first group communication session, that the UE has joined or is attempting to join a second group communication session. The server applies a policy for selectively allocating additional QoS resources to supplement the first level of QoS resources to the UE for concurrently supporting both the first and second group communication sessions in response to the detection.

32 Claims, 10 Drawing Sheets

(51) Int. Cl.
*H04W 8/18* (2009.01)
*H04W 4/06* (2009.01)

(56) References Cited

U.S. PATENT DOCUMENTS

| | | |
|---|---|---|
| 8,908,843 B2 | 12/2014 | Manor |
| 2002/0181686 A1* | 12/2002 | Howard et al. .......... 379/202.01 |
| 2006/0055771 A1* | 3/2006 | Kies ........................... 348/14.03 |
| 2007/0180119 A1* | 8/2007 | Khivesara et al. ........... 709/226 |
| 2008/0132269 A1* | 6/2008 | Shen et al. .................. 455/550.1 |
| 2011/0194433 A1 | 8/2011 | Song et al. |
| 2011/0276715 A1* | 11/2011 | King .............................. 709/235 |
| 2012/0077536 A1* | 3/2012 | Goel et al. .................... 455/518 |
| 2012/0102131 A1* | 4/2012 | Lin ........................ H04L 12/66 709/207 |
| 2012/0250509 A1 | 10/2012 | Leung et al. |
| 2013/0136036 A1 | 5/2013 | Chen et al. |
| 2013/0148607 A1* | 6/2013 | Yu et al. ....................... 370/329 |

OTHER PUBLICATIONS

International Search Report and Written Opinion—PCT/US2013/057400—ISA/EPO—Feb. 27, 2014.

\* cited by examiner

SELECTIVELY ALLOCATING QUALITY OF SERVICE TO SUPPORT MULTIPLE CONCURRENT SESSIONS FOR A CLIENT DEVICE

CLAIM OF PRIORITY UNDER 35 U.S.C. §119

The present Application for Patent claims priority to Provisional Application No. 61/695,740, entitled "NETWORK ASSISTED TALK GROUP SCANS", filed Aug. 31, 2012, by the same inventors as the subject application, assigned to the assignee hereof and hereby expressly incorporated by reference herein in its entirety.

BACKGROUND OF THE INVENTION

1. Field of the Invention

Embodiments of the invention relate to network assisted talk group scans.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

SUMMARY

In an embodiment, a server mediates a first group communication session with the user equipment (UE) by exchanging media for the first group communication session with the UE over a first link with a first level of Quality of Service (QoS) resources (e.g., either without a guaranteed bit rate (GBR) or a threshold amount of GBR) and exchanging non-media signaling data for the first group communication session with the UE over a signaling link that is either the same or separate from the first link. The server detects, while the UE continues participation in the first group communication session, that the UE has joined or is attempting to join a second group communication session. The server applies a policy for selectively allocating additional QoS resources to supplement the first level of QoS resources to the UE for concurrently supporting both the first and second group communication sessions in response to the detection.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
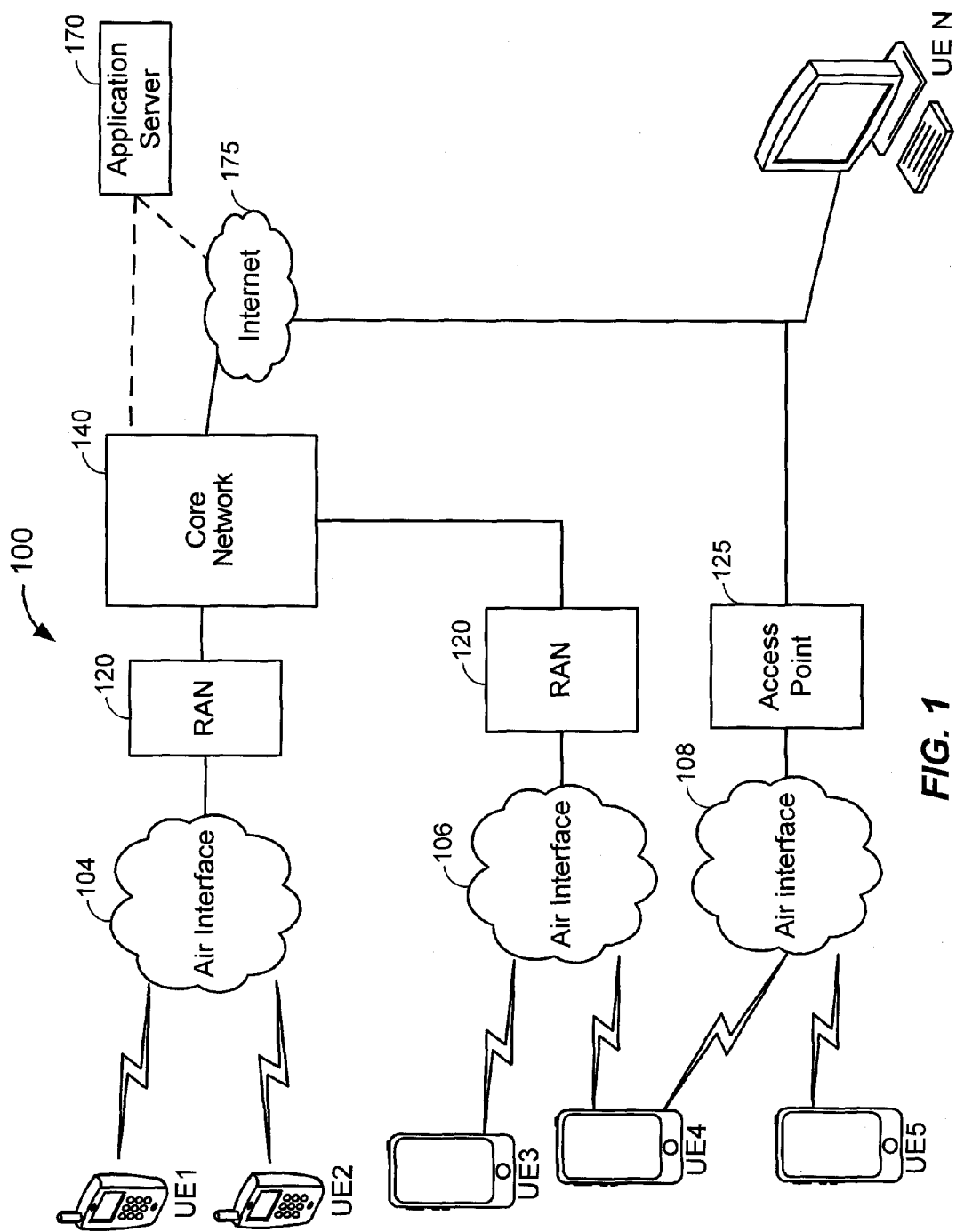
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
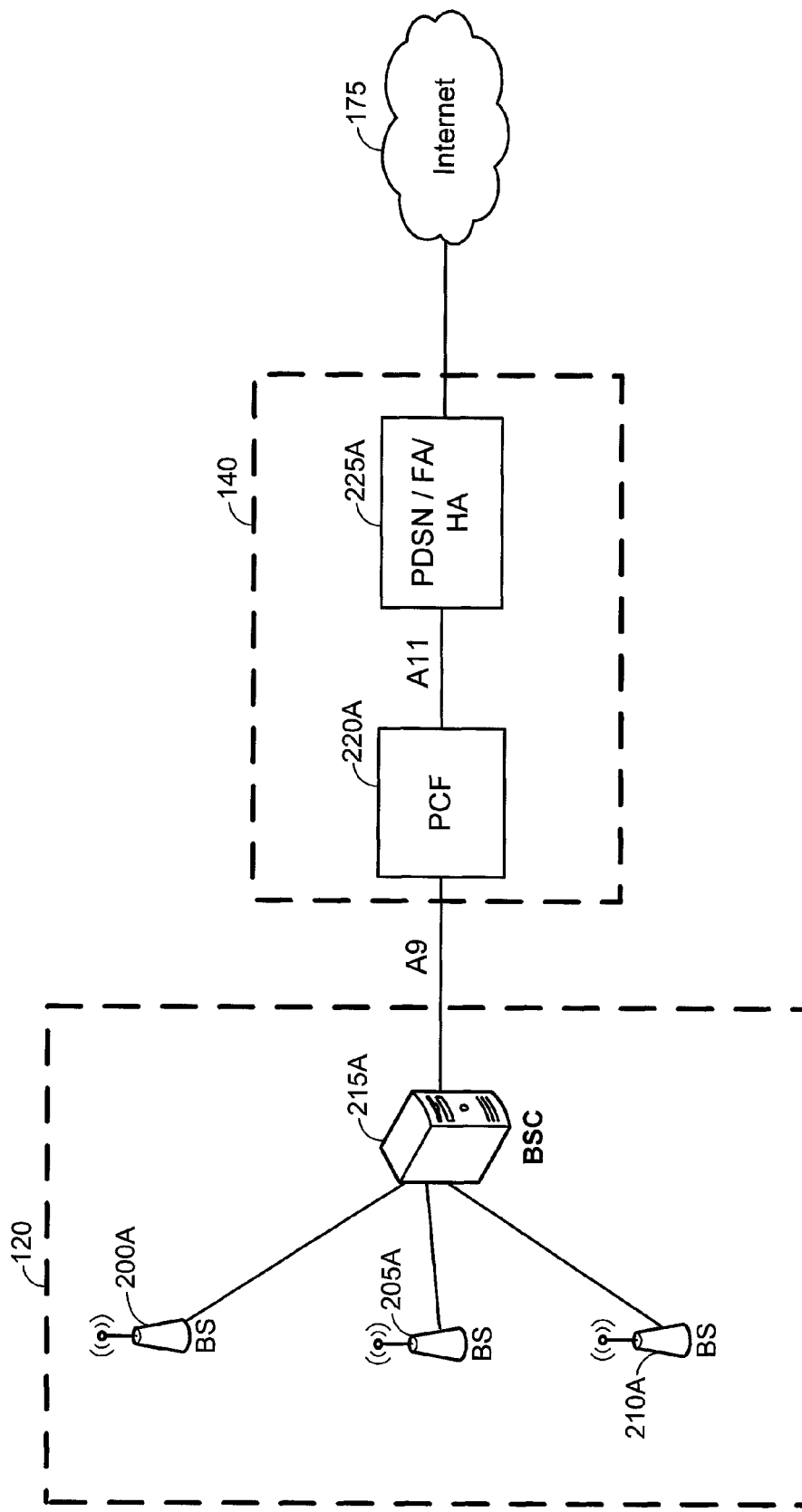
FIG. 2A illustrates an example configuration of a radio access network (RAN) and a packet-switched portion of a core network for a 1× EV-DO network in accordance with an embodiment of the invention.

FIG. 2A illustrates an example configuration of the RAN 120 and the core network 140 for packet-switched communications in a CDMA2000 1× Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
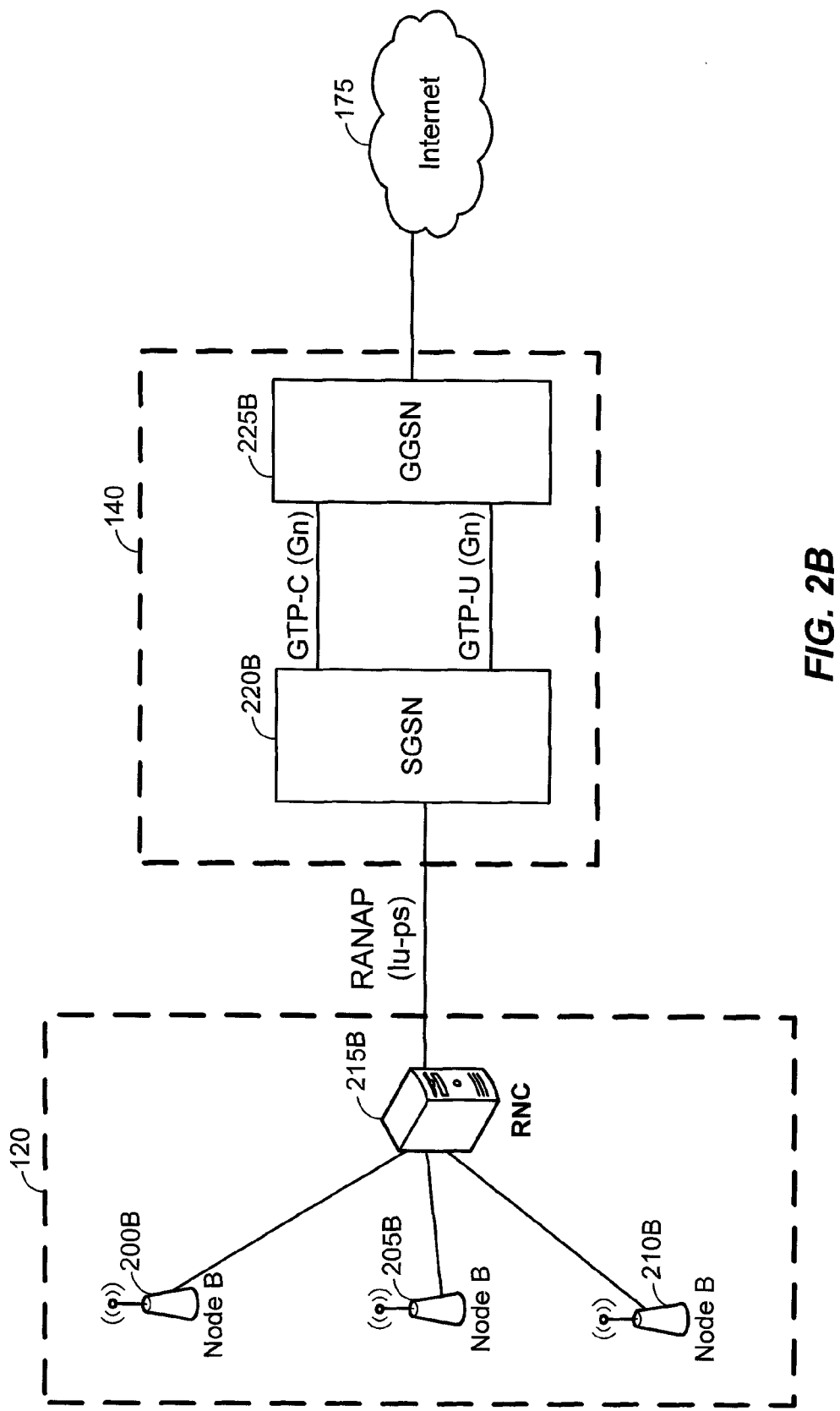
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1× EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
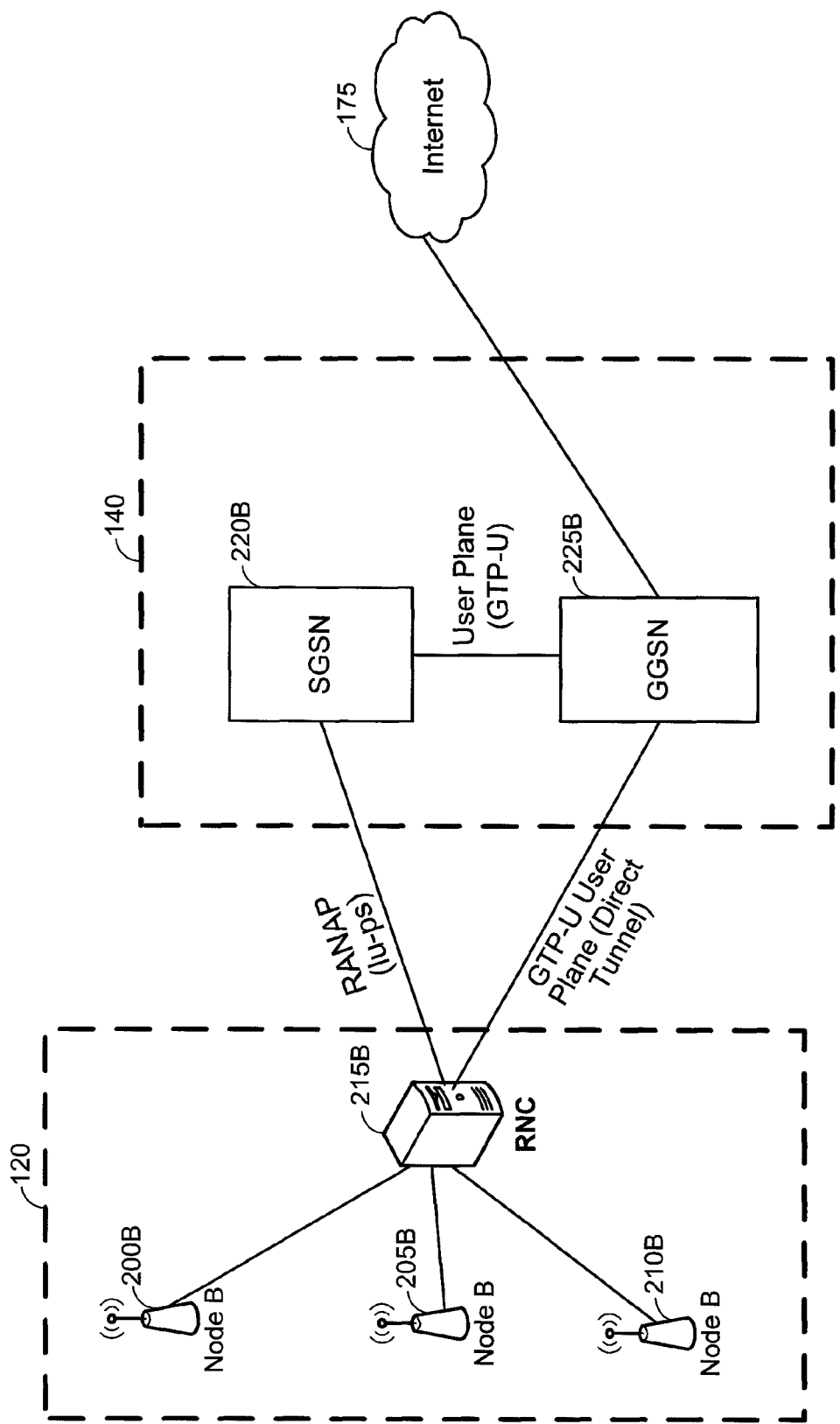
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
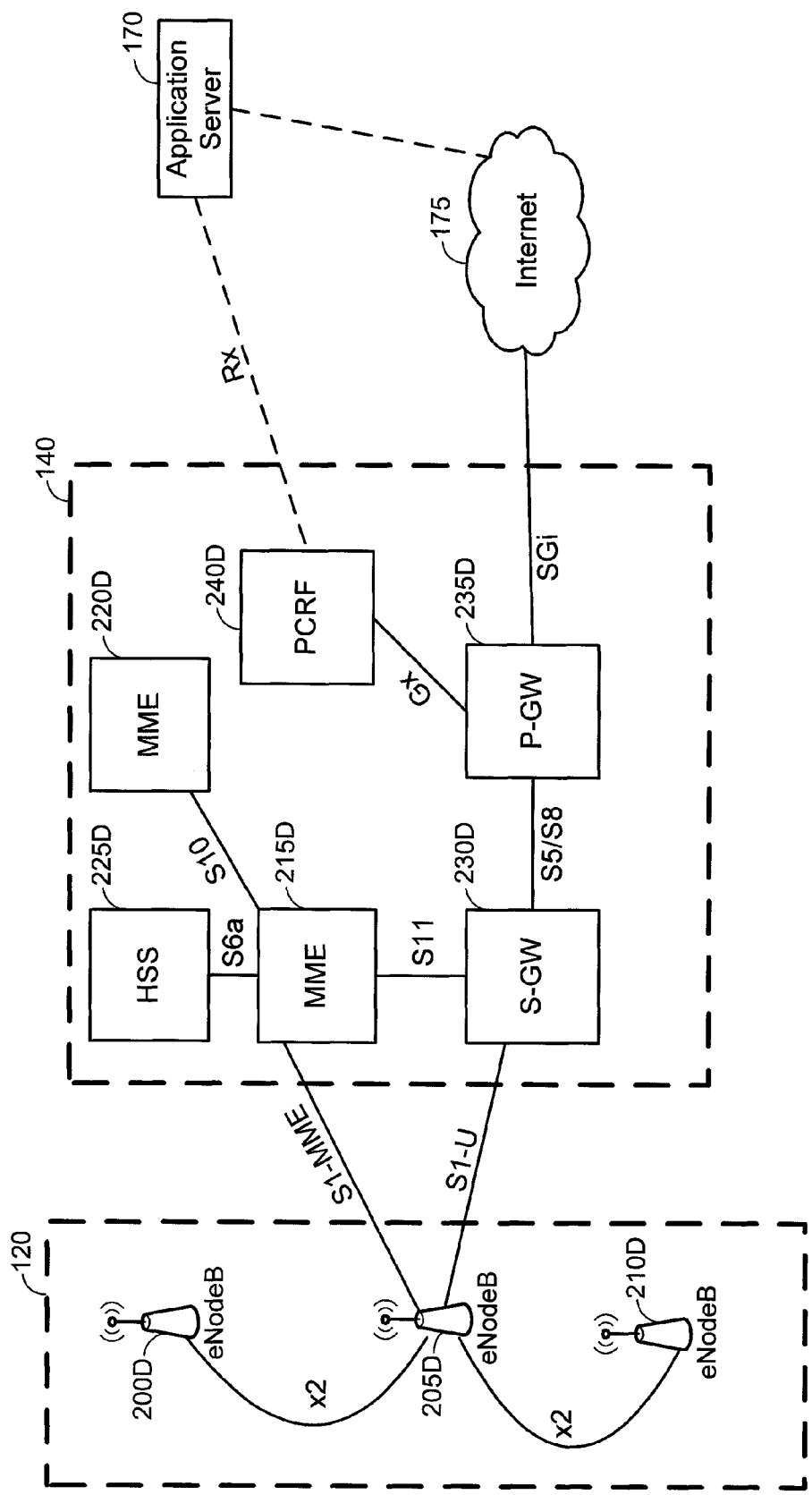
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
| --- | --- |
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
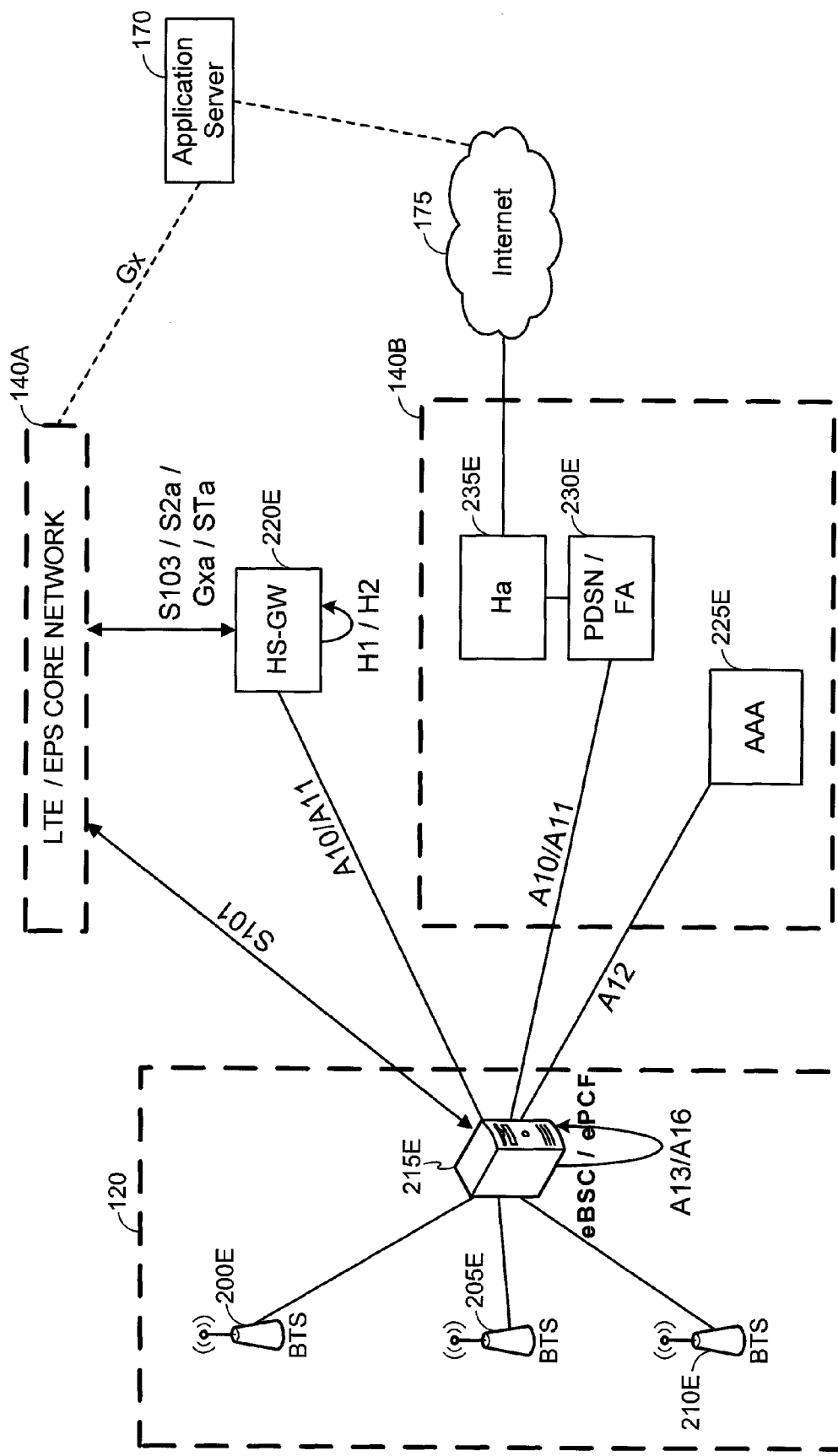
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 230D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
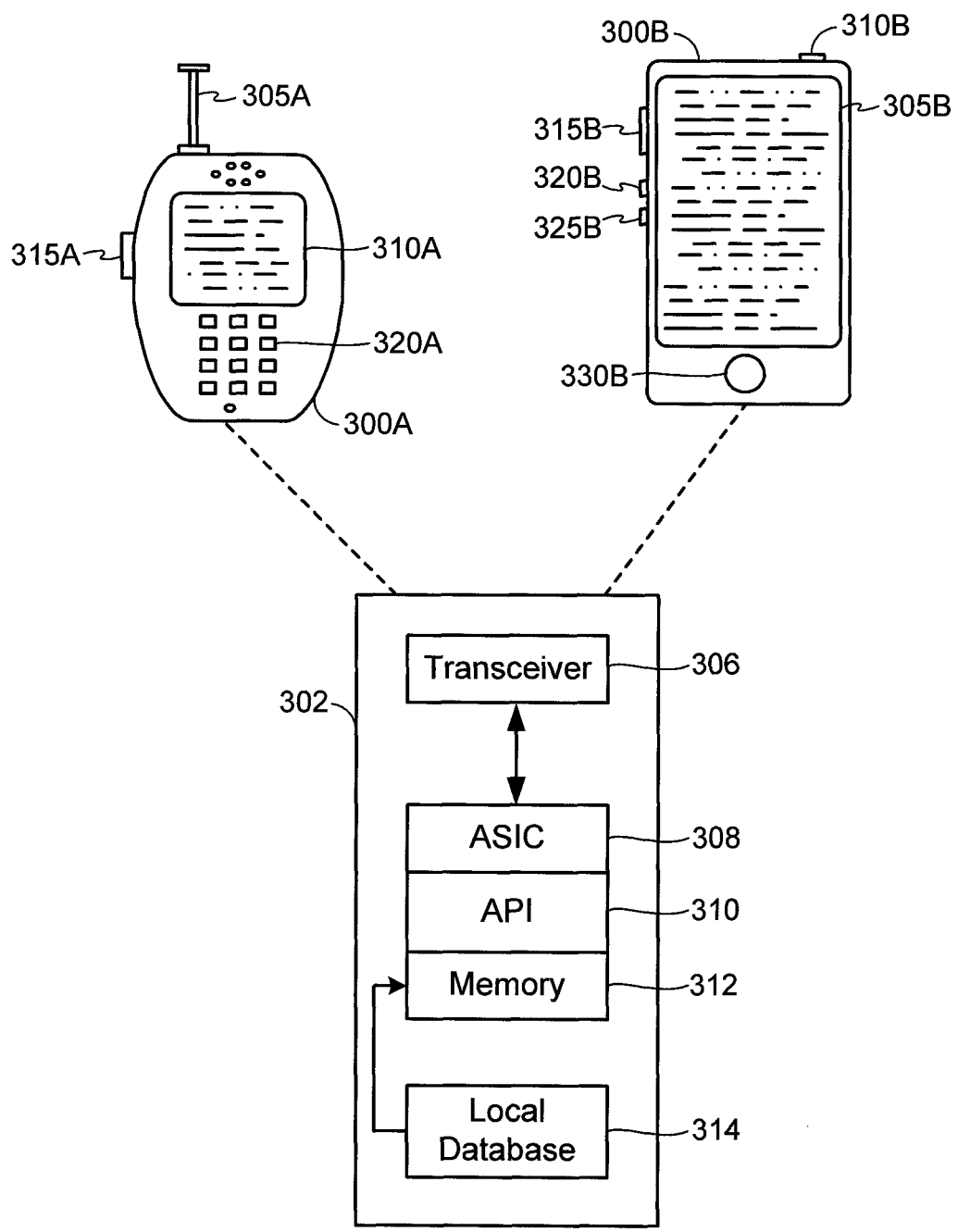
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
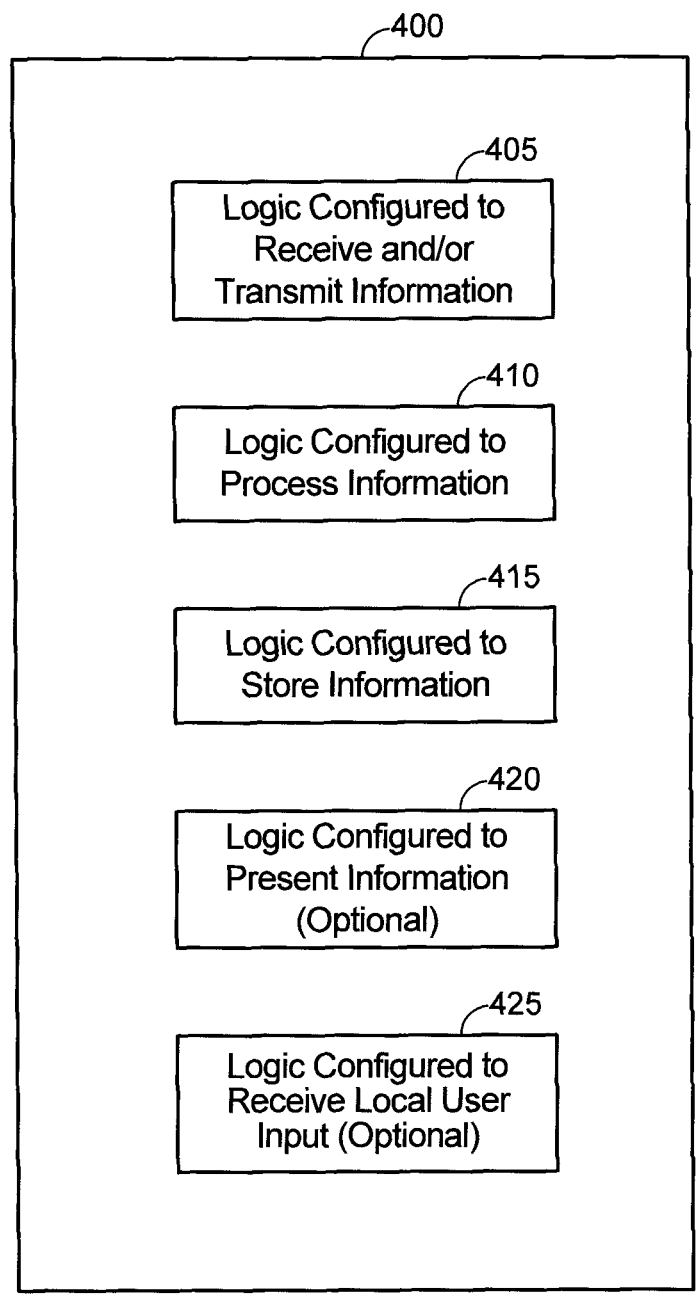
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Sessions that operate over networks such as 1× EV-DO in FIG. 2A, UMTS-based W-CDMA in FIGS. 2B-2C, LTE in FIG. 2D and eHRPD in FIG. 2E can be supported on channels (e.g. RABs, flows, etc.) for which a guaranteed quality level is reserved, which is referred to as Quality of Service (QoS). For example, establishing a given level of QoS on a particular channel may provide one or more of a minimum guaranteed bit rate (GBR) on that channel, a maximum delay, jitter, latency, bit error rate (BER), and so on. QoS resources can be reserved (or setup) for channels associated with real-time or streaming communication sessions, such as Voice-over IP (VoIP) sessions, group communication sessions (e.g., PTT sessions, etc.), online games, IP TV, and so on, to help ensure seamless end-to-end packet transfer for these sessions.

GBR or QoS EPS bearers in LTE can be associated with a preconfigured QCI for "Conversational Voice" traffic, denoted as QCI '1', which is associated with a specific QoS configuration for the associated GBR EPS bearers. Any VoIP application engaging in VoIP sessions over the LTE core network can invoke QCI '1'. Generally, different multimedia services that interact with the LTE core network are assigned different APNs for their operation over the LTE core network. For example, IP Multimedia Subsystem (IMS) applications use an IMS-specific APN, whereas a non-IMS application (denoted herein as App*) can used an App*-specific APN, and so on.

App* may correspond to a delay-sensitive half-duplex VoIP or Push-to-Talk (PTT) application, whereby App* calls are configured to be arbitrated by the application server 170 and, for UEs served by LTE networks, are allocated QoS resources based on QCI '1' or based upon an application-specific QCI configuration denoted as $QCI_{App*}$. Each App* call is typically allocated a non-QoS (or low-QoS) or non-GBR EPS (or low-GBR) bearer to handle a signaling flow and a QoS or GBR EPS bearer to handle a media flow for the App* call. As used herein, a "non-QoS" or "non-GBR" EPS bearer may correspond to a bearer that is not allocated any QoS or GBR, or alternatively is allocated a relatively low amount of QoS or GBR (e.g., 1 kpbs, a GBR that is less than a threshold sufficient to support an audio or video media flow, etc.). Thus, a description of "non-Qos" or "non-GBR" does not necessarily mean that there is absolutely zero GBR or QoS on the associated bearer for all potential implementations, although this is certainly possible. The non-QoS or non-GBR EPS bearer may alternatively be referred to as a signaling bearer, although it is appreciated that the signaling bearer can primarily be dedicated to signaling traffic while still carrying non-signaling traffic in certain scenarios. If an App* client application on a given UE is already engaged in an App* call, that App* client application will generally automatically reject any newly announced App* calls. Alternatively, the application server 170 can detect that the App* client application is already engaged in an App* call and then refrain from announcing any new App* calls until the App* client application drops out of the existing App* call.

Multiple QoS call monitoring, such as a talk group scan feature available in Analog Public safety PTT, is difficult to implement in packet-switched based UEs, for e.g., LTE. One reason for this is because, to allow the user to monitor multiple QoS calls (e.g., PTT calls) in LTE, the media for each QoS call would typically need to be "piggy-backed" or consolidated onto a single QoS bearer and media for each QoS call would need to be delivered to the target UE over that single QoS bearer, where a user of the target UE would decide which call to monitor from an active list of calls. However, adding the media to the single QoS bearer in this manner may exceed the allocated bandwidth (or GBR) for the QoS bearer, leading to poor service quality for talk group scan feature.

Accordingly, embodiments of the invention are directed to dynamically allocating QoS to multiple QoS calls (referred to herein as App* calls) for a given UE in an LTE network. A high-level call flow of an embodiment of the invention is illustrated in FIG. 5.

Figure 5:
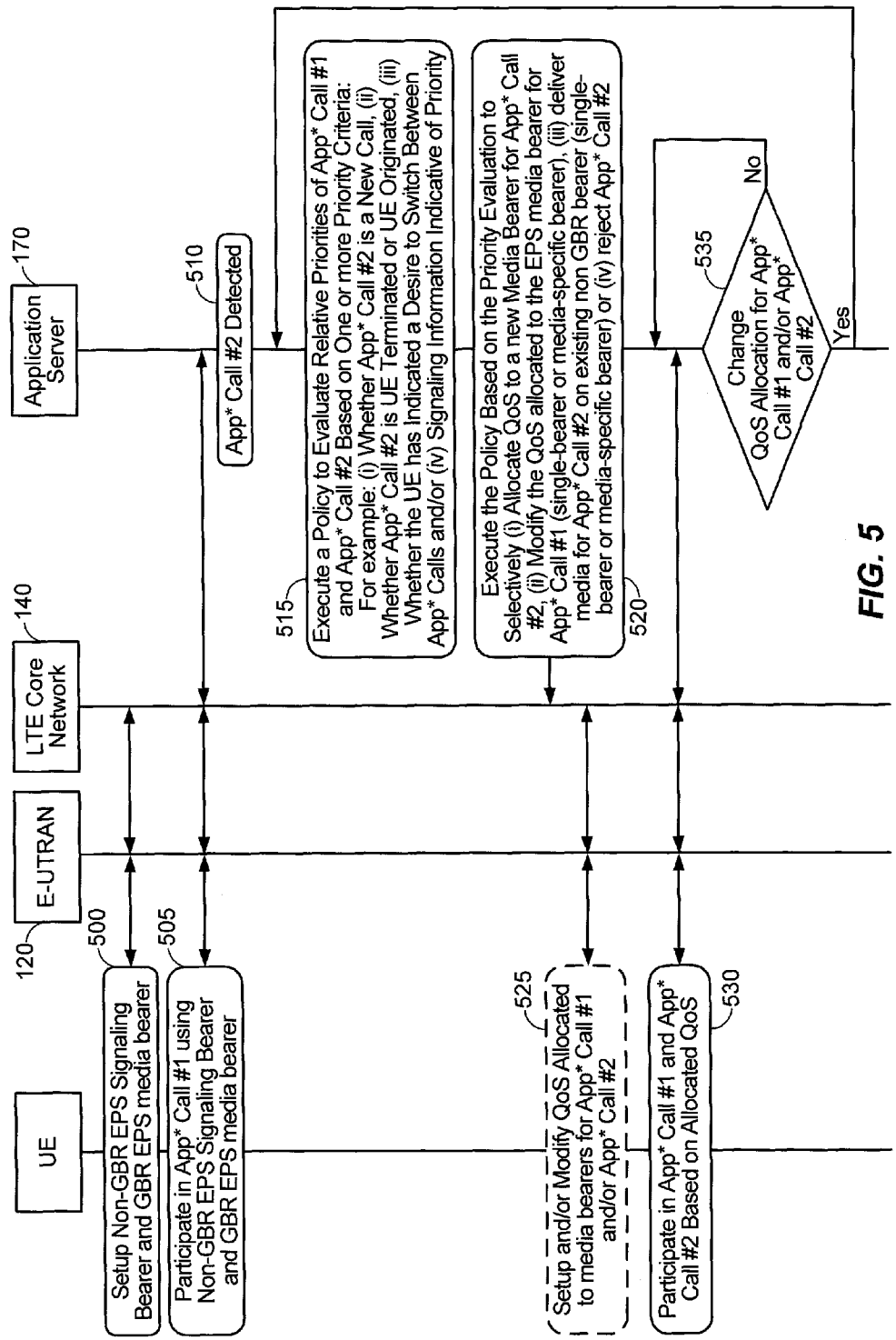
FIG. 5 illustrates a process of dynamically allocating QoS to multiple QoS calls for a given UE in an LTE network in accordance with an embodiment of the invention.

Referring to FIG. 5, a given UE sets up a non-GBR EPS bearer for signaling and a GBR EPS bearer for media with a threshold amount of GBR (e.g., based on QCI '1' or $QCI_{App*}$) for a first App* call to be arbitrated by the application server 170, 500. Alternatively, the UE may use a single bearer for signaling and media, e.g., a "shared" GBR or non-GBR EPS bearer. Thus, even though embodiments below reference a "non-GBR EPS signaling bearer" and a "GBR EPS media bearer", both signaling and media could alternatively be mapped to the same EPS bearer (e.g., a single GBR or non-GBR EPS bearer) in other implementations.

The first App* call may be half-duplex or full-duplex, may be originated by the given UE or some other UE, and may be a one-to-one or direct call (1:1) or a one-to-many or group call. Once the non-GBR EPS signaling bearer and the GBR EPS media bearer are established (or alternatively a single EPS bearer is used by the UE for both media and signaling), the given UE participates in the first App* call via the application server 170 using the non-GBR EPS signaling bearer and the GBR EPS media bearer (or the single EPS bearer for both media and signaling), 505.

At some point during the given UE's participation in the first App* call, the application server 170 detects a second App* call involving the given UE, 510. Similar to the first App* call, the second App* call may be half-duplex or full-duplex, may be originated by the given UE or some other UE, and may be a one-to-one or direct call (1:1) or a one-to-many or group call. The application server 170 executes a "policy" to evaluate the relative priorities of the first and second App* calls based on one or more priority criteria defined by the policy, 515. As used here, the policy refers to a set of rules configured for execution by the application server 170 related to selective resource allocation for one or more App* calls. The policy can be configured by a user of the given UE, by an operator of the application server 170, and/or by a developer of a multimedia application configured to support App* calls, etc. In 515, the policy defines the priority criteria used to gauge the relative priorities between two App* calls, and in 520 (discussed below), the policy also defines available call actions that can be triggered based on the relative priorities after the evaluation. In an example, the one or more priority criteria defined by the policy can include (i) whether the second App* call is a new call or an existing call, (ii) whether the second App* call is originated by the given UE or by some other UE, (iii) whether the given UE has provided an implicit or explicit indication of a desire to switch between App* calls and/or (iv) whether signaling information (e.g., an application-layer signaling message or packet) is received over the non-GBR EPS bearer for signaling (or the single EPS bearer for both media and signaling) that includes an indication of the priorities for the first and/or second App* call (e.g., the given UE may indicate that the second App* call has higher priority than the first App* call, or vice versa, or the given UE may identify an absolute priority level for one of the App* calls against which the application server 170 can compare with a known priority level of the other App* call to determine their relative priorities, etc.).

Based on the priority evaluation from 515, the application server 170 executes the policy to selectively (i) allocate QoS to a GBR EPS media bearer for the second App* call, (ii) modify an existing QoS level allocated to the GBR EPS media bearer(s) for the first and/or second App* calls (or if a single bearer is being used for both signaling and media, modify the QoS on the single EPS bearer), (iii) deliver media for the second App* call on the GBR EPS media bearer used by the first App* call (or if a single bearer is being used for both signaling and media, deliver the media for the second App* call on the single EPS bearer), and/or (iv) reject the second App* call, 520. In other words, the policy executed by the application server 170 can identify wherein a number of bearers (e.g., zero if second App* call is rejected, one if the second App* call will be sending its media and signaling over a single EPS bearer, two if the second App* call will be using different EPS bearers for media and signaling, etc.) and/or a second level of QoS (e.g., the QoS on a new GBR EPS media bearer in (i), an amount of QoS achieved via the QoS level modification in (ii), etc.) for supporting the second App* call based on the relative priorities of the first and second App* calls (e.g., additional examples provided below with respect to Table 3). In an example, if the given UE is switching between concurrently monitored App* calls, the QoS levels allocated to the respective App* calls can be adjusted. In another example, if the given UE is merely beginning to monitor the second App* call, QoS can be allocated to the second App* call, and so on. Accordingly, the given UE sets up and/or modifies its QoS allocated to the first and/or second App* calls via negotiation with the LTE network (if necessary), 525. In the case where the second App* call is carried on the first App* call's GBR EPS media bearer or simply rejected, 525 can be optional because the QoS resources do not necessarily change. The given UE then participates in the first and/or second App* calls based on the QoS allocation from 525, 530. For example, at 530, the given UE may actively participate (e.g., receive and playback incoming media and/or record and stream outgoing media) in the second App* call while monitoring (receiving media) for the first App* call, or the given UE may actively participate in the first App* call while monitoring (receiving media) for the second App* call, and so on.

At 535, the application server 170 determines whether to change the QoS allocation for the first and/or second App* calls. For example, the decision at 535 may be based upon whether the given UE has switched its active participation between the first and second App* calls, whether the given UE has dropped the first and/or second App* calls, and so on. Thus, 535 can correspond to a continued execution or re-execution of the policy executed at 515-520 based on updated information for the first and/or second App* calls.

As will be appreciated by one of ordinary skill in the art, FIG. 5 is broadly characterized so as to cover various call types (e.g., half-duplex or full-duplex), various call origination parties (e.g., the given UE can be the call originator or the call target), and can occur at various stages during the calls (e.g., the operations in FIG. 5 can occur for a newly announced second App* call, or for switching active participation in two concurrently monitored and ongoing App* calls). Table 1 (below) describes a number of operating scenarios (referred to as "cases") and associated QoS allocation adjustments (referred to as "QoS actions") that can occur within the framework of FIG. 5, whereby the App* client application on the given UE is assumed to be actively participating in the first App* call:

TABLE 3

Examples of QoS Allocations Between Multiple App* Calls

| | Second App* Call Status | Second App* Call Origination Status | Potential Policy-Defined QoS Actions |
|---|---|---|---|
| Case #1 [New Call] | New (no QoS allocated to Second App* Call yet) | UE Originated | Option #1: Second App* Call is Allocated QoS; No Change to First App* Call.<br>Option #2: Second App* Call is Allocated Best Effort (BE); No Change to First App* Call.<br>Option #3: Second App* Call is Allocated QoS, and First App*; First App* Call is Reduced to BE QoS. |
| Case #2 [New Call] | New (no QoS allocated to Second App* Call yet) | UE Terminated | Option #1: Second App* Call is Allocated QoS; First App* Call is Reduced to BE QoS.<br>Option #2: Second App* Call is Allocated QoS; No Change to First App* Call.<br>Option #3: Second App* Call is Allocated BE; No Change to First App* Call.<br>Option #4: Second App* Call is Not Allocated QoS; Application Server 170 Stores Call Data; No Change to First App* Call.<br>Option #5: Second App* Call is Rejected; No Change to First App* Call. |
| Case #3 [Switching In-Call] | [Switching in Call] The second App* call is being monitored by the given UE via BE or QoS bearer, and the given UE indicates a desire to switch from active participation in the first App* call to active participation in the second App* call | N/A | Option #1: Second App* Call is Allocated QoS; First App* Call is reduced to BE.<br>Option #2: Second App* Call is Allocated QoS, and First App*; No Change to First App* Call.<br>Option #3: Second App* Call is Allocated BE; No Change to First App* Call. |
| Case #4 [Switching In-Call] | The first App* call is being monitored by the given UE via BE or QoS bearer, and the given UE indicates a desire to switch from active participation in the second App* call to active participation in the second App* call | N/A | Option #1: First App* Call is Allocated QoS; Second App* Call is reduced to BE.<br>Option #2: First App* Call is Allocated QoS, and First App*; No Change to Second App* Call.<br>Option #3: First App* Call is Allocated BE; No Change to Second App* Call. |

Referring to Table 3 (above), in case #1, the second App* call is a new communication session originated by the given UE that is being setup by the application server 170. Because the given UE is the session originator, the application server 170 assumes that the given UE wants to be an active participant in the second App* call. Accordingly, the application server 170 can allocate the second App* call QoS without changing the QoS allocation to the first App* call (i.e., the aggregate QoS allocated to the given UE is increased) as shown in Option #1, the second App* call can be allocated a Best Effort (BE) (no explicit QoS guarantee, but the second App* call will instead be setup using the best available QoS) as shown in Option #2, or the second App* call can be allocated QoS while reducing the first App* call to BE as shown in Option #3 (i.e., the aggregate QoS allocated to the given UE is unchanged). Thus, the policy executed by the application server 170 can be configured in accordance either any of Options #1, #2 or #3 for case #1 in Table 1 in an example.

Referring to Table 3 (above), in case #2, the second App* call is a new communication session originated by another UE (i.e., not the given UE) that is being setup by the application server 170. Because the given UE is not the session originator, the application server 170 cannot simply assume that the given UE wants to be an active participant in the second App* call. Accordingly, the application server 170 can allocate the second App* call QoS while reducing the first App* call to BE as shown in Option #1 (i.e., the aggregate QoS allocated to the given UE is unchanged), the application server 170 can allocate the second App* call QoS without changing the QoS allocation to the first App* call (i.e., the aggregate QoS allocated to the given UE is increased) as shown in Option #2, the second App* call can be allocated BE without changing the QoS allocation to the first App* call (i.e., the aggregate QoS allocated to the given UE is unchanged) as shown in Option #3, the second App* call is not allocated QoS (not even BE) and the application server 170 stores the call data for later retrieval by the given UE as shown in Option #4, or the second App* call is simply rejected by the application server 170 (not announced to the given UE) as shown in Option #5. Thus, the policy executed by the application server 170 can be configured in accordance either any of Options #1 through #5 for case #2 in Table 1 in an example.

Referring to Table 3 (above), in cases #3 and #4, the given UE is switching between activation participation in the first and second App* calls (i.e., in case #3, from the first App* call to the second App* call, and in case #4, from the second App* call to the first App* call). The target App* call for the active participation switch can be allocated QoS while reducing the QoS allocation for the current App* call to BE as in Option #1 of case #3 or case #4, the target App* call for the active participation switch can be allocated QoS without changing the QoS allocation for the current App* call as in Option #2 of case #3 or case #4, or the target App* call for the active participation switch can be allocated BE without changing the QoS allocation for the current App* call as in Option #3 of case #3 or case #4. Thus, the policy executed by the application server 170 can be configured in accordance either any of Options #1, #2 or #3 for cases #3 or #4 in Table 1 in an example.

Figure 6:
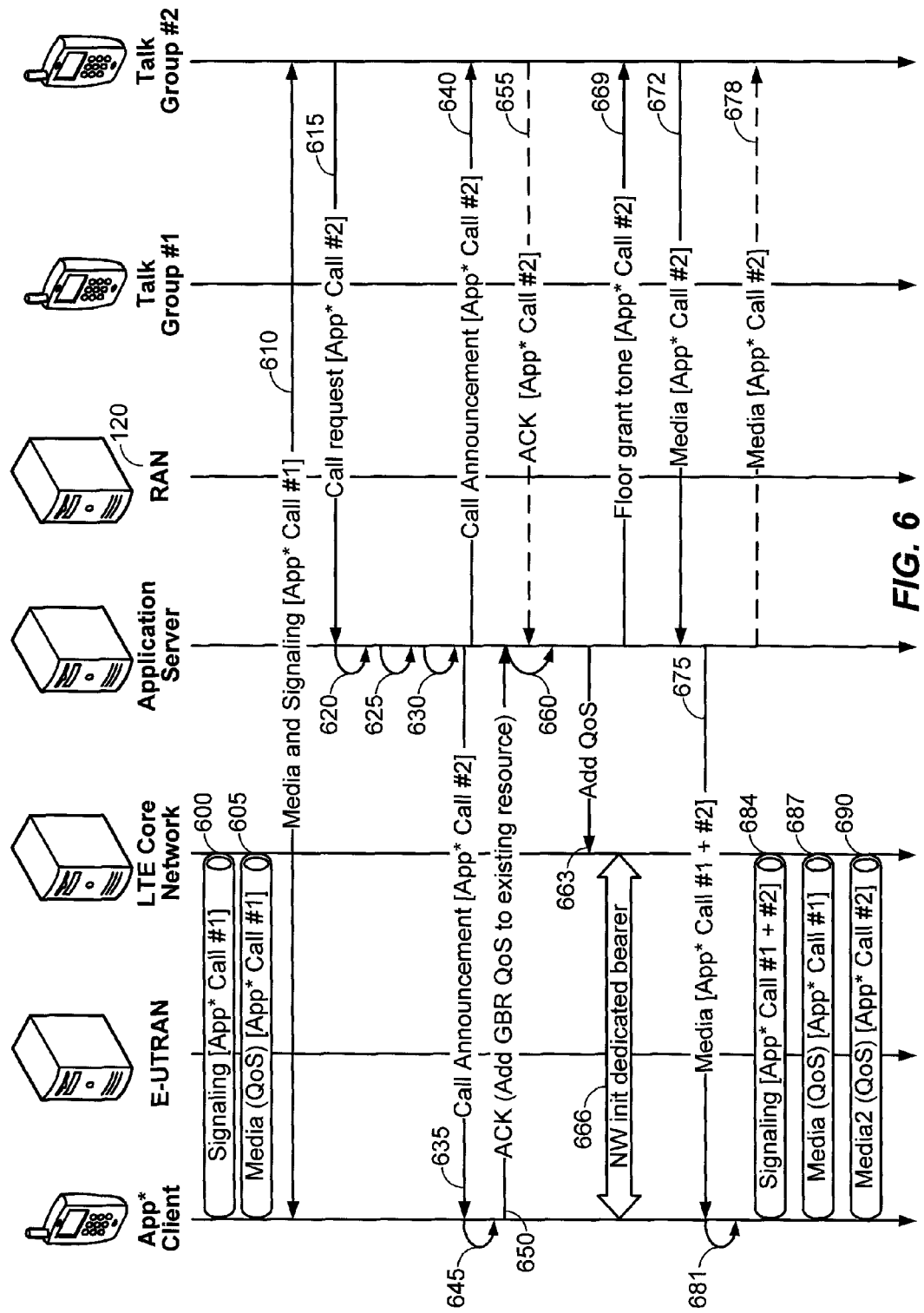
FIG. 6 illustrates a case-specific implementation example of FIG. 5 in accordance with an embodiment of the invention.

FIG. 6 illustrates an example implementation of FIG. 5 for Option #3 of case #2 from Table 3 (above) in accordance with an embodiment of the invention. In particular, FIG. 6 is an example implementation of FIG. 5 whereby the first and second App* calls are each half-duplex calls (e.g., PTT calls) to first and second talk groups, respectively. The first and second talk groups include a single UE for a 1:1 or direct call, and multiple UEs for a one-to-many or group call. In FIG. 6, the given UE is served by an LTE network (e.g., the RAN 120 for the given UE is the LTE RAN or E-UTRAN, and the core network 140 for the given UE is the LTE core network 140, as illustrated in FIG. 2D). The UEs among the first and second talk groups are shown as connected to the RAN 120 as well, and the RAN 120 for the UEs in the first and second talk groups can correspond to any type of RAN in association with any type of core network, such as EV-DO, LTE, UMTS or W-CDMA, eHRPD, etc.

Referring to FIG. 6, the bearer state for App* client application on the given UE corresponds to an allocation of a non-GBR EPS bearer for application layer signaling, 600, and a GBR EPS bearer for exchanging media (e.g., voice packets, video packets, etc.), 605, for the first App* call (e.g., as in 500 of FIG. 5), over which media and signaling information is exchanged with the first talk group during the first App* call, 610 (e.g., as in 505 of FIG. 5). Alternatively, as discussed above, the bearer state for App* client application on the given UE can be assigned a single EPS (e.g., GBR or non-GBR) bearer for both signaling and media for the first App* call over which media and signaling information is exchanged with the first talk group during the first App* call, 610.

At some point during the given UE's participation in the first App* call, a given UE from the second talk group sends a call request to initiate the second App* call, 615 (e.g., as in 510 of FIG. 5). The application server 170 evaluates the resource allocation for the prospective participants of the second App* call, 620, determines that the App* client application on the given UE is already in an App* call and has resources assigned thereto, 625, and the application server 170 determines to announce the second App* call, 630, by sending announcement messages to the given UE, 635, and to UE(s) in the second talk group other than the call originator (if any), 640. At 645, the scenario described above with respect to case #2 is thereby invoked (UE terminated call announcement when another call is active), and it is assumed in FIG. 6 that a user of the given UE selects Option #3 for case #2 (i.e., add GBR QoS for second App* call to existing resources). Accordingly, the given UE sends an ACK (accept) message to the application server 170 that indicates call acceptance based on Option #3 of case #2, 650, and one or more UE(s) in the second talk group also ACK the call announcement, 655 (for a group call scenario, 655 may be omitted for a 1:1 App* call).

Referring to FIG. 6, the application server 170 receives the call acceptance messages from at least one target UE, determines to notify the LTE core network 140 of the given UE to add the additional QoS resources for supporting the second App* call, 660 (e.g., as in 515 of FIG. 5), and the application server 170 sends the add-QoS notification for the second App* call to the LTE core network 140, 663 (e.g., as in 520 of FIG. 5), and the LTE core network 140 initiates setup of a new dedicated GBR EPS bearer for supporting the second App* call, 666. The application server 170 sends a floor grant message to the call originator, 666, after which the call originator begins transmitting media for the second App* call, 672. The application server 170 sends the media from the call originator of the second App* call to the given UE, 675, and also, for a group call, to other UE(s) in the second talk group, 678. The application server 170 also sends media from the ongoing first App* call to the given UE at 675. The App* client application on the given UE thereby receives media from both the first and second App* calls, 681. While not shown explicitly in FIG. 6, one of these App* calls may be active (played at the given UE) while another may be muted (not played). Accordingly, after QoS is allocated to the second App* call in accordance with Option #3 of case #3 from Table 3 (above), the bearer state for App* client application on the given UE corresponds to an allocation of a non-GBR EPS signaling bearer for both the first and second App* calls (e.g., the same signaling bearer from 600), 684, a first GBR EPS media bearer for the first App* call, 687, and a second GBR EPS media bearer for the second App* call, 690 (e.g., as in 525 of FIG. 5).

As will be appreciated, FIG. 6 is provided as an example of how FIG. 5 can be modified to accommodate one particular case and option combination from Table 3. It will be readily understood how other case and option combinations from Table 3 could be accommodated in other embodiments of the invention.

While the embodiments above have been described primarily with reference to 1x EV-DO architecture in CDMA2000 networks, GPRS architecture in W-CDMA or UMTS networks and/or EPS architecture in LTE-based networks, it will be appreciated that other embodiments can be directed to other types of network architectures and/or protocols.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a server configured to support group communication sessions for a user equipment (UE), comprising:

mediating, at the server, a first group communication session with the UE by exchanging media for the first group communication session with the UE over a first link with a first level of Quality of Service (QoS) resources and exchanging non-media signaling data for the first group communication session with the UE over a signaling link that is either the same or separate from the first link;

detecting, at the server, while the UE continues participation in the first group communication session, that the UE has joined or is attempting to join a second group communication session; and executing, at the server, a policy that is based upon comparing a first priority of the first group communication session and a second priority of the second group communication sessions for selectively allocating additional QoS resources to supplement the first level of QoS resources to the UE for concurrently supporting both the first and second group communication sessions in response to the detection.

2. The method of claim 1,
wherein the first link and the signaling link are separate, and
wherein the first level of QoS resources reserves at least a threshold guaranteed bit rate (GBR) for the first link.

3. The method of claim 1, wherein the first link and the signaling link are mapped to a common link to which the first level of QoS resources is assigned.

4. The method of claim 3, wherein the first level of QoS resources is zero such that the common link does not have a guaranteed bit rate (GBR).

5. The method of claim 3, wherein the first level of QoS resources reserves at least a threshold guaranteed bit rate (GBR) for the common link.

6. The method of claim 1,
wherein the policy identifies a number of bearers and/or a second level of QoS resources required for the second group communication session, and
wherein the executing selects whether to allocate the additional QoS resources based on the identified number of bearers and/or the second level of QoS resources.

7. The method of claim 1, wherein the first link is a first QoS link and the first level of QoS resources reserves at least a threshold guaranteed bit rate (GBR).

8. The method of claim 7,
wherein the comparing indicates that the second priority of the second group communication session is a high priority,
wherein, based on the comparing, the executing allocates a second QoS link with a second level of QoS resources to the UE for supporting an exchange of media with the UE for the second group communication session.

9. The method of claim 8,
wherein the high priority of the second group communication session is based on the second group communication session being originated by the UE, and/or
wherein the high priority of the second group communication session is based on the second group communication session being a new session that the UE is attempting to join, and/or
wherein the high priority of the second group communication session is based on an indication that a user of the UE wishes to actively participate in the second group communication session by playing and/or transmitting media for the second group communication session, and/or
wherein the high priority of the second group communication session is based on an indication in an application layer signaling message on the signaling link indicating that the second group communication session has a higher priority than the first group communication session.

10. The method of claim 7,
wherein the comparing indicates that the second priority of the second group communication session is a high priority,
wherein, based on the comparing, the executing increases the first level of QoS resources on the first QoS link to a higher level in order to support an exchange of media with the UE for both the first and second group communication sessions on the first QoS link.

11. The method of claim 10,
wherein the high priority of the second group communication session is based on the second group communication session being originated by the UE, and/or
wherein the high priority of the second group communication session is based on the second group communication session being a new session that the UE is attempting to join, and/or
wherein the high priority of the second group communication session is based on an indication that a user of the UE wishes to actively participate in the second group communication session by playing and/or transmitting media for the second group communication session and/or
wherein the high priority of the second group communication session is based on an indication in an application layer signaling message on the signaling link indicating that the second group communication session has a higher priority than the first group communication session.

12. The method of claim 7, wherein the executing includes determining that the first level of QoS resources on the first QoS link is sufficient to support an exchange of media with the UE for both the first and second group communication sessions, such that the executing does not allocate the additional QoS resources.

13. The method of claim 1,
wherein the comparing indicates that the second priority of the second group communication session is a low priority,
wherein, based on the comparing, the executing includes determining to reject the second group communication session for the UE, such that the selectively allocating does not allocate the additional QoS resources.

14. The method of claim 13,
wherein the low priority of the second group communication session is based on the second group communication session being originated by another UE,
wherein the low priority of the second group communication session is based on the second group communication session being an existing call that the UE previously joined, and/or
wherein the low priority of the second group communication session is based on an indication that a user of the UE does not wish to actively participate in the second group communication session by playing and/or transmitting media for the second group communication session, and/or
wherein the low priority of the second group communication session is based on an indication in an application layer signaling message on the signaling link indicating that the second group communication session has a lower priority than the first group communication session.

15. The method of claim 1,
wherein the comparing indicates that the second priority of the second group communication session is a higher priority than the first priority of the first group communication session,
wherein, based on the comparing, the executing includes re-allocating at least a portion of the first level of QoS resources from the first group communication session to the second group communication session, such that the executing does not allocate the additional QoS resources and a useable portion of the first level of QoS resources for the first group communication session is reduced.

16. The method of claim 1,
wherein the comparing indicates that the second group communication session is a lower priority than the first priority of the first group communication session,
wherein, based on the comparing, the executing includes determining to permit the second group communication session to be supported for the UE without QoS, such that the executing does not allocate the additional QoS resources.

17. The method of claim 1, wherein the policy is configured to allocate a higher relative priority level to UE-originated group communication sessions and a lower priority to UE-terminated group communication sessions.

18. The method of claim 1, wherein the policy is configured to allocate a higher relative priority level to group communication sessions to which the UE is actively participating by transmitting and/or playing associated media and a lower priority to group communication sessions to which the UE is passively monitoring without active participation.

19. The method of claim 1, wherein the detecting detects that the UE has joined or is attempting to join the second group communication session in conjunction with setup of the second group communication session.

20. The method of claim 1, wherein the detecting detects that the UE has joined or is attempting to join the second group communication session during an in-call phase of the second group communication session.

21. The method of claim 1,
wherein, prior to the detection, the UE is an active participant in the first group communication session by playing and/or transmitting media for the first group communication session while passively monitoring media received in association with the second group communication session, and
wherein the detection indicates that the UE is attempting to switch its active participation from the first group communication session to the second group communication session.

22. The method of claim 1, further comprising:
mediating the second group communication session with the UE by exchanging media for the second group communication session with the UE via the first level of QoS resources and/or the selectively allocated additional QoS resources and exchanging non-media signaling data for the second group communication session with the UE over the signaling link.

23. The method of claim 1, wherein the signaling link is used to concurrently support an exchange of non-media signaling data for both the first and second group communication sessions.

24. The method of claim 1, wherein the signaling link is not allocated any QoS resources.

25. The method of claim 1, wherein the signaling link is allocated a low level of QoS resources that is less than the first level of QoS resources.

26. The method of claim 1, wherein the signaling link is primarily dedicated to supporting the exchange of the non-media signaling data for the first and/or second group communication sessions.

27. The method of claim 1, wherein the signaling link is exclusively dedicated to supporting the exchange of the non-media signaling data for the first and/or second group communication sessions.

28. The method of claim 1, wherein the first and second group communication sessions are real-time, streaming communication sessions that each carry at least audio, video or a combination of audio and video.

29. The method of claim 1, wherein the executing includes:
communicating, by the server, with a core network to allocate, modify and/or terminate one or more Evolved Packet System (EPS) media bearers.

30. A server configured to support group communication sessions for a user equipment (UE), comprising:
means for mediating a first group communication session with the UE by exchanging media for the first group communication session with the UE over a first link with a first level of Quality of Service (QoS) resources and exchanging non-media signaling data for the first group communication session with the UE over a signaling link that is either the same or separate from the first link;
means for detecting, while the UE continues participation in the first group communication session, that the UE has joined or is attempting to join a second group communication session; and
means for executing a policy that is based upon comparing a first priority of the first group communication session and a second priority of the second group communication sessions for selectively allocating additional QoS resources to supplement the first level of QoS resources to the UE for concurrently supporting both the first and second group communication sessions in response to the detection.

31. A server configured to support group communication sessions for a user equipment (UE), comprising:
logic configured to mediate a first group communication session with the UE by exchanging media for the first group communication session with the UE over a first link with a first level of Quality of Service (QoS) resources and exchanging non-media signaling data for the first group communication session with the UE over a signaling link that is either the same or separate from the first link;
logic configured to detect, while the UE continues participation in the first group communication session, that the UE has joined or is attempting to join a second group communication session; and
logic configured to execute a policy that is based upon comparing a first priority of the first group communication session and a second priority of the second group communication sessions for selectively allocating additional QoS resources to supplement the first level of QoS resources to the UE for concurrently supporting both the first and second group communication sessions in response to the detection.

32. A non-transitory computer-readable medium containing instructions stored thereon, which, when executed by a server configured to support group communication sessions for a user equipment (UE), cause the server to perform operations, the instructions comprising:
- at least one instruction configured to cause the server to mediate a first group communication session with the UE by exchanging media for the first group communication session with the UE over a first link with a first level of Quality of Service (QoS) resources and exchanging non-media signaling data for the first group communication session with the UE over a signaling link that is either the same or separate from the first link;
- at least one instruction configured to cause the server to detect, while the UE continues participation in the first group communication session, that the UE has joined or is attempting to join a second group communication session; and
- at least one instruction configured to cause the server to execute a policy that is based upon comparing a first priority of the first group communication session and a second priority of the second group communication sessions for selectively allocating additional QoS resources to supplement the first level of QoS resources to the UE for concurrently supporting both the first and second group communication sessions in response to the detection.

* * * * *